United States Patent [19]

Marcatili

[11] 4,380,364
[45] Apr. 19, 1983

[54] VELOCITY MISMATCHED GATE

[75] Inventor: Enrique A. J. Marcatili, Rumson, N.J.

[73] Assignee: Bell Telephone Laboratories, Incorporated, Murray Hill, N.J.

[21] Appl. No.: 174,831

[22] Filed: Aug. 4, 1980

[51] Int. Cl.³ .............................................. G02B 5/14
[52] U.S. Cl. ............................... 350/96.14; 350/96.13
[58] Field of Search ............... 350/96.11, 96.12, 96.13, 350/96.14

[56] References Cited

U.S. PATENT DOCUMENTS 3,985,423 10/1976 Tseng ............................. 350/96.13
4,251,130 2/1981 Marcatili ......................... 350/96.14

Primary Examiner—David K. Moore
Attorney, Agent, or Firm—Sherman S.

[57] ABSTRACT

Because the refractive index of materials varies as a function of frequency, velocity matching of the electrical modulating signal and the optical signal in an optical velocity matched gate requires a special design of the electrical circuit. This requirement is avoided in a velocity mismatched gate simply by shaping the electrical signal wavepath so that interaction of the standing electrical wave with the optical wavepath occurs only along selected regions of the electrical signal wavepath. The net effect is to produce the equivalent of a velocity match.

8 Claims, 10 Drawing Figures

VELOCITY MISMATCHED GATE

TECHNICAL FIELD

This application relates to gating circuits.

BACKGROUND OF THE INVENTION

In U.S. Pat. No. 4,005,927 and copending applications by E. A. J. Marcatili, Ser. No. 58,744, filed July 18, 1979 and now U.S. Pat. No. 4,251,130, and by P. P. Liu et al (1–61), Ser. No. 161,761, filed June 23, 1980, and now U.S. Pat. No. 4,372,643 both of which are assigned to applicant's assignee, gating circuits of the velocity matched type (VMG) are disclosed. In the patent and the Marcatili application, gating is produced by a traveling electrical modulating signal that propagates in synchronism with an optical signal. These are the so-called "traveling wave, velocity matched gates" (TW-VMG). In the Liu et al application, the electrical circuit is tuned so as to produce a standing electrical wave. However, the two oppositely propagating waves that produce the standing wave are also velocity matched to the optical signal. This class of devices is the so-called "standing wave, velocity matched gate" (SW-VMG).

The general problem with both classes of velocity matched gates resides in the fact that the refractive indices of the substrate material in which the gate is formed are very different at the electrical signal and optical signal frequencies. As a consequence, a special design of the electrical wavepath is required to satisfy the velocity match requirement, and to the extent that the velocities of the signals are not matched, the switching efficiency degenerates significantly.

SUMMARY OF THE INVENTION

The instant invention is a standing wave, velocity mismatched gate (SW-VMMG) which avoids the match requirement of the prior art gates simply by shaping the electrical signal wavepath so that interaction of the standing electrical wave with the optical signal wave occurs only along selected regions of the electrical signal wavepath. The net effect is to produce the equivalent of a velocity matched, alternating $\Delta\beta$ coupler of many sections, similar to the prior art standing wave, velocity matched gate.

DETAILED DESCRIPTION

Figure 1:
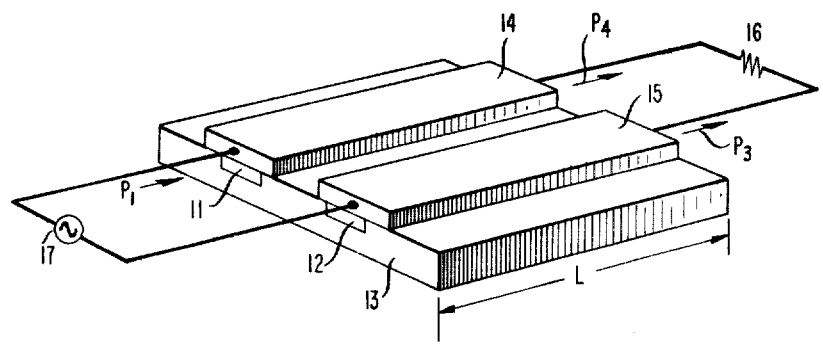
FIG. 1 shows a prior art traveling wave, velocity matched gate.

The operation of both the velocity matched prior art gates and the instant velocity mismatched gate is based upon controlling the transfer efficiency between a pair of coupled wavepaths. For purposes of explanation and illustration, reference will be made to electrical and optical signals, and electrical and optical wavepaths. However, it should be understood that the principles of the invention are equally applicable to any kind of interacting wavepaths including, for example, electron beams, solitons, phonons, etc. In addition, such interaction can occur at any frequencies. With these facts in mind, reference is now made to FIG. 1 which shows a prior art TW-VMG of the type disclosed in the above-cited Marcatili application. The gate comprises an optical directional coupler 10 including a pair of essentially identical dielectric waveguides 11 and 12 embedded in an electrooptic substrate 13 of lower refractive index. The guides are coupled over an interval L, where the coupling coefficient per unit length, $\kappa$, and the coupling interval L are related by $$\kappa L = \pi/2 \tag{1}$$

Modulating means for varying the transfer efficiency between the guides comprise a pair of electrodes 14 and 15 which, in the illustrated embodiment, are located directly over the optical waveguides 11 and 12, respectively. The electrodes form an electrical transmission line that is terminated at its output end by a resistor 16 whose magnitude is equal to the characteristic impedance of the line, and is energized at its input end by a signal source 17.

In the absence of a modulating electric signal from source 17, the propagation constants $\beta_1$ and $\beta_2$ of the two waveguides 11 and 12 are equal. As a result, an optical signal $P_1$, applied to one end of guide 11, is completely coupled to waveguide 12. If, however, an electric field is applied between the electrodes, the propagation constants $\beta_1$ and $\beta_2$ are locally perturbed due to the electrooptic effect. Thus, at any point x along the coupler, the propagation constant varies as a function of time t. Assuming a sinusoidal electrical signal of period T, the difference in phase constants $\Delta\beta$ is given by $$\Delta\beta = \beta_1 - \beta_2 = \frac{4\pi\Delta n}{\lambda} \sin\frac{2\pi}{T}\left(\frac{x}{v} - t\right) \tag{2}$$

where $\lambda$ is the free space wavelength of the optical signal;

v is the phase velocity of the electrical signal; and $\Delta n$ is the maximum index change introduced in each of the guides by the electrical field.

If the electrical and optical waves are not synchronized, photons entering the coupler see a constantly changing $\Delta\beta$ as they propagate therealong. More specifically, the phase constant difference varies between $\pm\Delta\beta$ to produce, in effect, an alternating $\Delta\beta$ coupler of the type described in an article by H. Kogelnik and P. V. Schmidt entitled "Switched Directional Couplers with Alternating $\Delta\beta$", published in the July 1976 issue of the *IEEE Journal of Quantum Electronics,* Vol. QE-12, No. 7, pages 396–401. As explained in this article, all of the incident signal can be transferred between coupled waveguides in an alternating $\Delta\beta$ coupler. Thus, the mere application of a modulating voltage is insufficient in itself to control the coupling between a pair of coupled waveguides. It is further required, in accordance with the teachings of the prior art, that the phase velocity of the modulating electric signal be synchronized with the group velocity of the optical signal. If both velocities are identical, it has been shown that only those photons that enter the system in synchronism with the zero crossover regions of the modulating signal are switched. All other photons, entering at other times, see a large net $\Delta\beta$ and are not switched. This velocity matching is also shown to be required in the standing wave, velocity matched gate of Liu et al. In this embodiment of the gate, the electrical wavepath is reactively terminated to produce a standing wave. However, as noted hereinabove, the two oppositely propagating waves that produce the standing wave are velocity matched to the optical signal.

The present invention, by contrast, provides a means for controlling the transfer of signal power between coupled guides notwithstanding the fact that the modulating voltage and the optical signal do not propagate along their respective wavepaths at the same velocity. This is accomplished by shaping the electrical signal electrodes so as to control the interaction between the two paths. The effect of this shaping is to produce the equivalent of a velocity match, and a mode of operation of the type described hereinabove in connection with standing wave, velocity-matched gates.

To understand how this can be realized, let us first consider the optical path and the electrical path separately. With respect to the former, the velocity of propagation, $v_o$, is given by $$v_o = \frac{\lambda_o}{t_o} = \frac{c}{n_o} \tag{3}$$

where $\lambda_o$ is the spatial period (wavelength) of the optical signal in the optical wavepath;

$t_o$ is the temporal period of the optical wave;

c is the free space velocity of electromagnetic radiation;

$n_o$ is the effective refractive index of the optical wavepath.

A similar relationship exists for the velocity, $v_e$, of the electrical signal. That is, $$v_e = \frac{\lambda_e}{t_e} = \frac{c}{n_e}, \tag{4}$$

where $\lambda_e$ is the spatial period (wavelength) of the electrical signal in the electrical wavepath;

$t_e$ is the temporal period of the electrical wave;

c is the free space velocity of electromagnetic radiation; and $n_e$ is the effective refractive index of the electrical wavepath.

Figure 2:
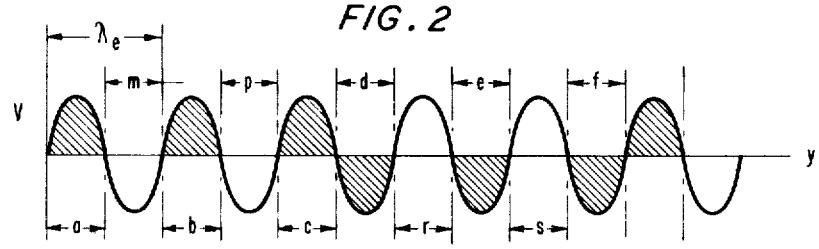
FIG. 2 shows the standing wave pattern along the electrical wavepath.
Figure 3:
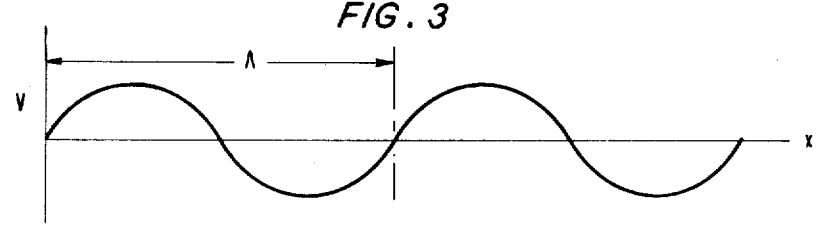
FIG. 3 shows what the standing wave electrical pattern should be as a function of distance along the optical wavepath.

As is evident from equations (3) and (4), the velocity of propagation of each of the two signals of interest is a function of the ratio of its spatial period, $\lambda$, to its temporal period, t. In addition, it is noted that the velocity of propagation is inversely proportional to the refractive index of the wavepath of the respective signals. Since $n_e > n_o$ (i.e., $n_e \approx 6$, whereas $n_o \approx 2$ in $LiNbO_3$), the optical signal travels approximately three times as fast as the electrical signal. In order to compensate for this difference, in accordance with the present invention, the electrodes along which the electrical signal propagates are shaped in a manner to simulate a faster propagating wave. The manner in which this is achieved can be explained by reference to FIGS. 2, 3 and 4. More specifically, FIG. 2 shows the actual standing wave pattern as a function of distance Y along the electrical wavepath. The spatial period of the wave is given by $\lambda_e$. FIG. 3 shows what the electrical standing wave should be as a function of distance x along the optical wavepath if the electrical signal and the optical signal are to be velocity matched. Its period is $\Lambda = \lambda_e n_e/n_o$. (For purposes of illustration, we assume $n_e/n_o = 3$.)

To simulate the wavelength $\Lambda$ along the optical wavepath for a velocity match, the electrodes are shaped such that the shaded portions of the standing wave illustrated in FIG. 2 are brought close together, and only these selected (i.e., shaded) portions of the electrical wavepath are permitted to interact with the optical signal. The net result is illustrated by the standing wave pattern in FIG. 4, which shows the shaded portions as they are distributed along the coupling interval. As can be seen, the three positive half cycles designated a, b and c in FIG. 2 are repositioned so that they appear to be adjacent to each other. Similarly, the three negative half cycles, d, e and f, are repositioned so that they too appear adjacent to each other and to half cycles a, b and c. The net effect is to simulate a standing wave having the desired spatial period $\Lambda$.

Figure 5:
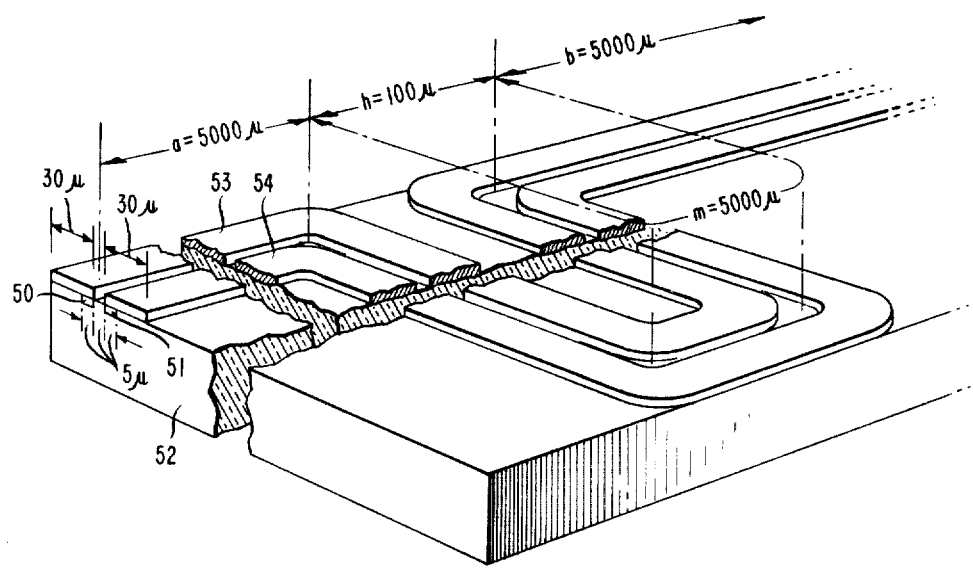
FIG. 5 shows one arrangement of the electrodes for producing the wave pattern shown in FIG. 4.

One arrangement of the electrodes for affecting this simulation is illustrated in FIG. 5, which shows a portion of a SW-VMMG comprising a pair of coupled, optical waveguiding regions 50 and 51 embedded in a substrate 52 of lower refractive index. Superimposed upon the respective optical wavepaths are a pair of electrodes 53 and 54. Whereas the electrodes in the prior art gates extend coextensively over the optical wavepaths, the electrodes illustrated in FIG. 5 are provided with intervals which extend away from and do not interact with the optical wavepaths. One such noninteracting interval, m, is shown in FIG. 5 located between the first interacting region, a, and the second interacting region, b. These regions correspond to regions a, b and m in FIG. 2.

Also illustrated in FIG. 5 are some typical dimensions. For example, optical wavepaths 50 and 51 are indicated as being 5$\mu$ wide, and separated by 5$\mu$. Electrodes 53 and 54 are 30$\mu$ wide. By comparison, interacting lengths a and b, and the noninteracting interval m are of the order of 5000$\mu$. The resulting gap, h, produced along the optical wavepath by the bent interval m is of the order of 100$\mu$. This length, being relatively small compared to the length of the interacting regions a and b, results in a minimum perturbation in the operation of the gate. It will be further noted that by keeping the distance between the electrodes constant over their entire lengths, there is also a minimum perturbation within the electrical wavepath.

Figure 4:
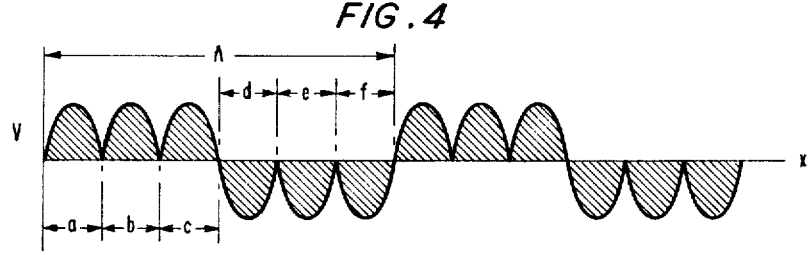
FIG. 4 shows the actual electrical standing wave along the optical wavepath as a result of shaping the electrical wavepath.
Figure 6:
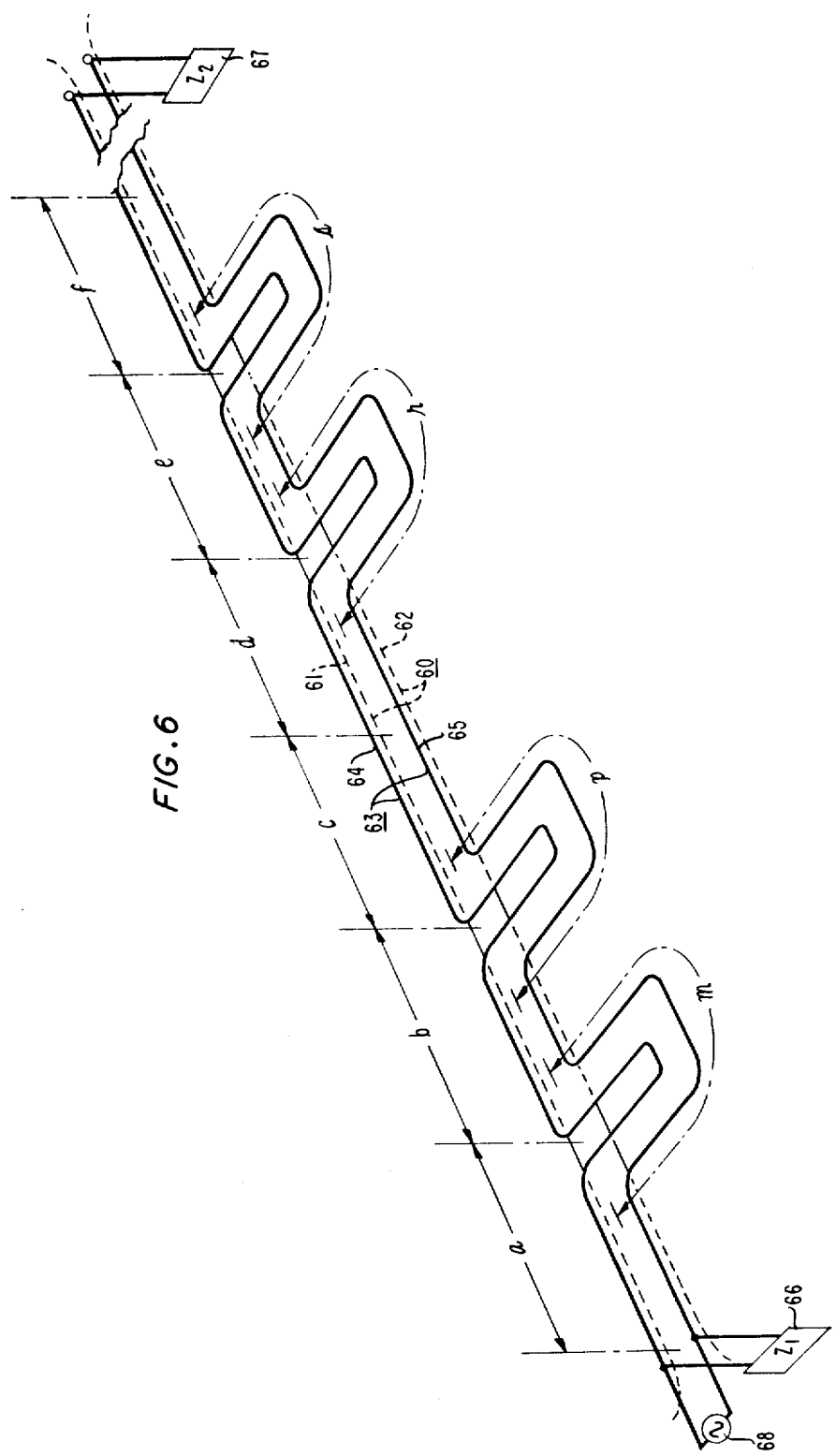
FIG. 6 shows a line sketch of an extended view of an electrode configuration to produce the wave pattern of FIG. 4.

FIG. 6 shows a line sketch of a SW-VMMG in accordance with the present invention having an electrode configuration to produce the standing wave pattern of FIG. 4. The coupled wavepaths 60 are represented by the dashed lines 61 and 62. These can be optical wavepaths of the type described in connection with FIG. 1. The modulating signal wavepath 63 is represented by the solid lines 64 and 65. These can be metallic electrodes as shown in FIG. 5. Reactive means 66 and 67 terminate the ends of wavepath 63 and serve to resonate the line to the frequency of the modulating signal supplied by a signal source 68.

The shaded interacting regions a, b, c, d, e and f, shown in FIG. 2, extend along the coupled wavepaths 61 and 62. These are separated by the nonshaded, noninteracting portions m, p, r and s of the standing wave pattern, which bend away from the coupled wavepath 61 and 62.

The length of the gate depends upon the number of $\Delta\beta$ section desired, as explained in the copending application by Liu et al referred to hereinabove and in the above-cited article.

Figure 7:
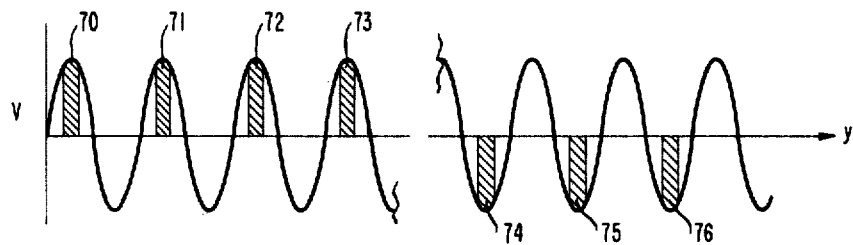
FIGS. 7, 8, 9 and 10 show alternative electrode arrangements and the resulting $\Delta\beta$ patterns.
Figure 8:
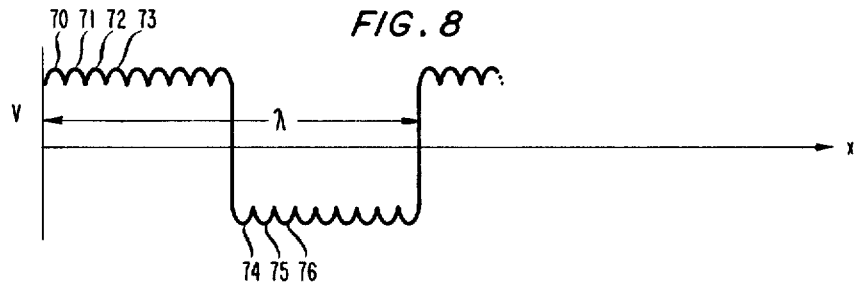

It will be recognized that other electrode arrangements can be made. For example, FIG. 7 illustrates the use of only a portion of each half cycle to obtain the standing wave pattern illustrated in FIG. 8. For example, if the shaded intervals 70, 71, 72, 73 . . . 74, 75, 76 . . . are one-third of each half cycle, a larger number of portions (i.e., 9) are needed to simulate the required spatial period A. The obvious disadvantage of this arrangement resides in the fact that longer electrodes are needed. As a consequence, the losses in the electrical modulating circuit may be higher than desirable. However, a more uniform interaction interval is produced.

Figure 9:
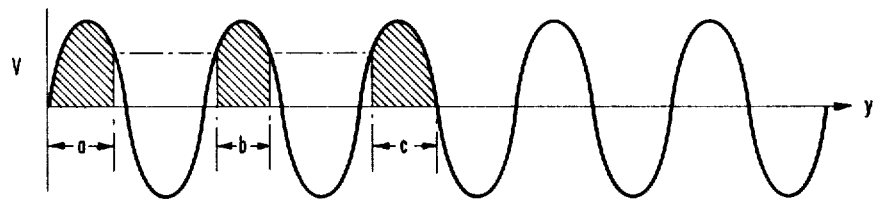
Figure 10:
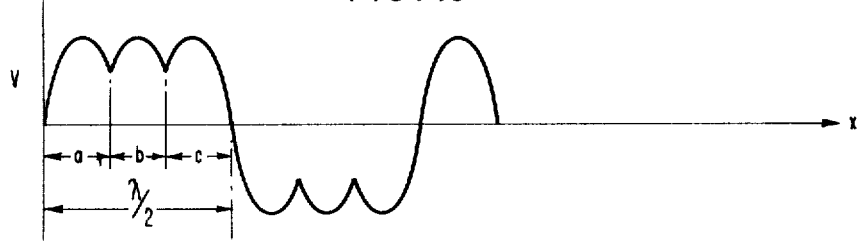

In the illustrative arrangement depicted in FIGS. 2, 3 and 4, $n_e/n_o$ was assumed equal to 3, $\lambda_e$ was an integral multiple of $\Lambda$ and, as a result, $a=b=c$, where $a+b+c=\Lambda/2$. In the more general case, $n_e/n_o$ is not an integer and the segments are not all equal, as illustrated in FIG. 9 where $a=c\neq b$. This results in the voltage characteristic illustrated in FIGS. 9 and 10. Thus, in general, by taking appropriate sections along the electrodes, the ratio of the spatial period to the temporal period for both the electrical and optical waves can always be equalized, and a matched condition simulated.

While not specifically illustrated, it is readily apparent that a standing wave gate, in accordance with the present invention, can be employed in lieu of the traveling wave gates used in the multiplexer, demultiplexer, power divider and pulse generator disclosed in the above-cited Marcatili application.

I claim:

1. In combination:
   a pair of coupled wavepaths (61, 62) and;
   traveling wave means (63) for producing a standing wave for locally modulating the difference in the phase constants of said coupled wavepaths (61, 62);
   characterized in that
   said traveling wave means (63) is disposed along said coupled wavepaths so as to have first, longitudinally disposed regions (a, b, c . . . ) which interact with said coupled wavepaths, separated by second, longitudinally disposed regions (m, p . . . ) along which there is no interaction with said coupled wavepaths.

2. The combination according to claim 1 wherein said coupled wavepaths (61, 62) are optical waveguides.

3. The combination according to claim 2 wherein said optical waveguides comprise a pair of substantially identical dielectric strips embedded in an electrooptic substrate of lower refractive index.

4. The combination according to claim 1 wherein said traveling wave (63) means comprises a pair of electrodes (64, 65), and means (66, 67) for reactively terminating said electrodes.

5. The combination according to claim 1 wherein the velocity of propagation, $v_o$, in said coupled wavepaths is different than the velocity of propagation, $v_e$, in said traveling wave means.

6. The combination according to claim 5 wherein:
   $v_o = \lambda_o/t_o$ and
   $v_e = \lambda_e/t_e$
   where
   $\lambda_o$ and $t_o$ are the spatial and temporal periods, respectively, of the signal in the coupled wavepaths; and
   $\lambda_e$ and $t_e$ are the spatial and temporal periods, respectively, of the signal in the traveling wave means;
   and wherein said first regions (a, b, c . . . ) form a standing wave along said wavepaths of spatial period $\Lambda$, where
   $\Lambda/t_e = \lambda_o/t_o$.

7. The combination according to claim 1 wherein said first regions (a, b, c . . . ) correspond, alternatively, to at least a portion of a plurality of positive half cycles and a plurality of negative half cycles of the standing wave along said traveling wave means.

8. The combination according to claim 1 wherein said regions form intervals of alternating $\Delta\beta$ along said coupled wavepaths.

* * * * *